United States Patent

[11] 3,633,187

[72] Inventors William B. Proctor; Jerry R. Youngstrom, both of Sunnyvale, Calif.

[21] Appl. No. 844,891

[22] Filed July 25, 1969

[45] Patented Jan. 4, 1972

[73] Assignee Memorex Corporation Santa Clara, Calif.

[54] METHOD AND APPARATUS FOR CERTIFYING MAGNETIC RECORDING TAPE
13 Claims, 8 Drawing Figs.

[52] U.S. Cl. .......... 340/174.1 B, 179/100.2 B, 226/118

[51] Int. Cl. .......... G11b 27/36, G11b 19/02

[50] Field of Search .......... 340/174.1 B, 174.1 G, 177.1 A; 321/34; 226/118, 27; 242/182; 179/100.2 B

[56] References Cited

UNITED STATES PATENTS

| | | | |
|---|---|---|---|
| 2,937,239 | 5/1960 | Garber et al. | 340/174.1 |
| 2,944,248 | 7/1960 | Auerbach et al. | 340/174.1 |
| 3,302,900 | 2/1967 | Messamer | 226/118 |
| 3,353,732 | 11/1967 | Rezder | 226/118 |
| 3,384,317 | 5/1968 | Bukovich et al. | 242/182 |
| 3,465,241 | 9/1969 | Metzger et al. | 324/34 |
| 3,499,614 | 3/1970 | Badum | 226/118 |

*Primary Examiner*—James W. Moffitt
*Assistant Examiner*—Vincent P. Canney
*Attorney*—Limbach, Limbach & Sutton

ABSTRACT: A digital tape certifier method and apparatus is disclosed wherein certification digit signals are recorded on the tape at desired density for certification, the signals read and the tape stopped and backed up when an error is detected. An optical digital encoder mounted on the capstan drive measures the length of tape moved forward and backward by the tape transport. If successive retries to certify the exactly measured position on the tape are unsuccessful, the tape is stopped at an inspection station. A tape accumulator is positioned between the detection station and the takeup station with a capacity larger than the distance between the detection station and the inspection station so that only the tape in the accumulator and not the takeup reel is reversed for certification retries. Dynamic skew is determined by detecting simultaneously impressed signals in the outside recording channels on the tape and measuring the time delay between such signals. A lay-on arm with an air bearing provides a uniform wrap of the tape on the takeup roll.

INVENTORS
WILLIAM B. PROCTOR
BY JERRY R. YOUNGSTROM
Limbach & Limbach
ATTORNEYS

INVENTORS
WILLIAM B. PROCTOR
JERRY R. YOUNGSTROM
BY
Limbach & Limbach
ATTORNEYS

INVENTORS
WILLIAM B. PROCTOR
BY JERRY R. YOUNGSTROM
Limbach & Limbach
ATTORNEYS

INVENTORS
WILLIAM B. PROCTOR
JERRY R. YOUNGSTROM
BY
Limbach & Limbach
ATTORNEYS

METHOD AND APPARATUS FOR CERTIFYING MAGNETIC RECORDING TAPE

BACKGROUND OF THE INVENTION

This invention is directed to a digital tape certifier method and apparatus for testing and certifying precision tape.

Presently, it is often desirable or necessary to provide assurance of the quality of precision magnetic tape such as computer tape, video tape, and instrumentation tape so that no information is lost. Therefore, it is desired to test precision tape for errors in the form of dropouts (loss of signal), noise, dynamic skew and average signal level. For certification of tape for high bit densities such as 800 or 3,200 bits per inch, it becomes important both to detect and then locate and correct any errors in the tape and subsequently package the certified tape to insure against subsequent damage.

The object of the present invention is to provide a digital tape certifier method and apparatus which can quickly detect and locate errors in magnetic tape and wind the certified tape in a tight uniform roll.

Broadly stated, the present invention, to be described in greater detail below, is directed to a magnetic recording tape certifying method and apparatus wherein a tape transport is provided for moving tape from a supply station past an inspection station and a detection station to a takeup station with provision for automatically moving the tape from the detection station back to the inspection station responsive to detection of an error at the detection station.

Movement of the tape is precisely controlled by a digital measuring means on the tape drive for accurately measuring the amount of tape moved forward and backward so that a specific portion of the tape where an error is detected can be retried for certification and if the retry is unsuccessful, moved to precise location at the inspection station for correction or removal.

In accordance with another aspect of the present invention, a tape accumulator is provided between the detection station and the takeup roll and having a tape capacity larger than the distance between the inspection and detection stations. In accordance with this construction, such capacity can be maintained in the accumulator while tape is fed off of the supply roll and removal of the tape from the takeup roll prevented as such capacity is reduced when the tape is moved from the detection station back to the inspection station. We have found that elimination of takeup reel reversal eliminates protrusion of the edges of individual tape layers from the tape pack. In this regard, it will be noted that the tape transport employed in our certifier does not provide a "tape reverse" but instead "-tape stop" signal to the takeup reel drive servo which is conventional in digital tape transports of this type. With this method and apparatus, the resultant roll of tape wrapped on the takeup roll has a smooth side surface which is not only pleasing to the purchaser, but also prevents undesired wear between the reel and tape edges projecting from the side surface during handling that might deleteriously affect the tape surface.

In accordance with still another aspect of the present invention, dynamic skew is measured and certified by detecting in the outside recording channels of the tape simultaneously recorded signals and measuring the time delay between signals detected.

In accordance with still another aspect of the present invention, the tape is tightly and uniformly wrapped on the takeup roll by spring biasing a portion of a lay-on arm against tape being wrapped on the takeup roll and blowing air through an aperture in that portion of the takeup arm thereby providing an air bearing between the portion of the takeup arm and the tape for tightly packing tape on the roll without causing excessive wear of the tape surface.

These and other features and advantages of the present invention will become more apparent from a perusal of the following specification taken in connection with the accompanying drawings wherein.

While it will be appreciated from the following description of the present invention that aspects of the invention are applicable to other methods and apparatus for performing other functions, the present invention is particularly suited for a digital tape certification method and apparatus and, therefore, will be described in detail below as applicable to such method and apparatus.

Figure 1:
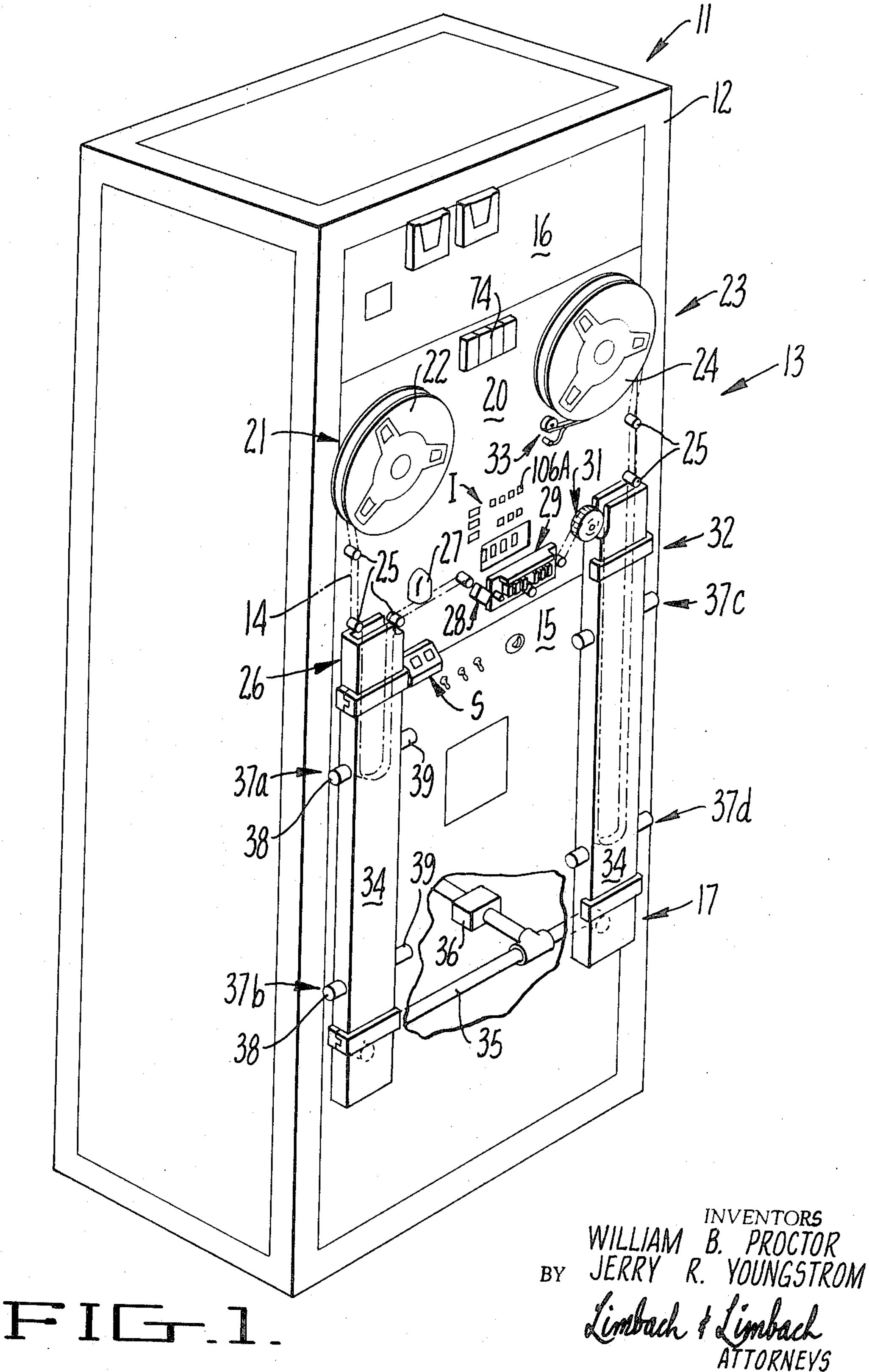
FIG. 1 is a perspective view of a digital tape certifying machine of the present invention with a portion broken away to show the interior of the apparatus.

Referring now to the drawing, with particular reference to FIG. 1, there is shown a digital tape certifier 11 having a cabinet 12 housing a tape deck assembly 13 for operation on a precision magnetic tape 14. Also included in the cabinet 12 are a transport control assembly 15, a test panel assembly 16 and associated electronics including data card racks and the like, and a lower portion 17 housing appropriate power supplies, servo electronics, cabinet wiring, and vacuum and vacuum control valve systems.

Figure 2:
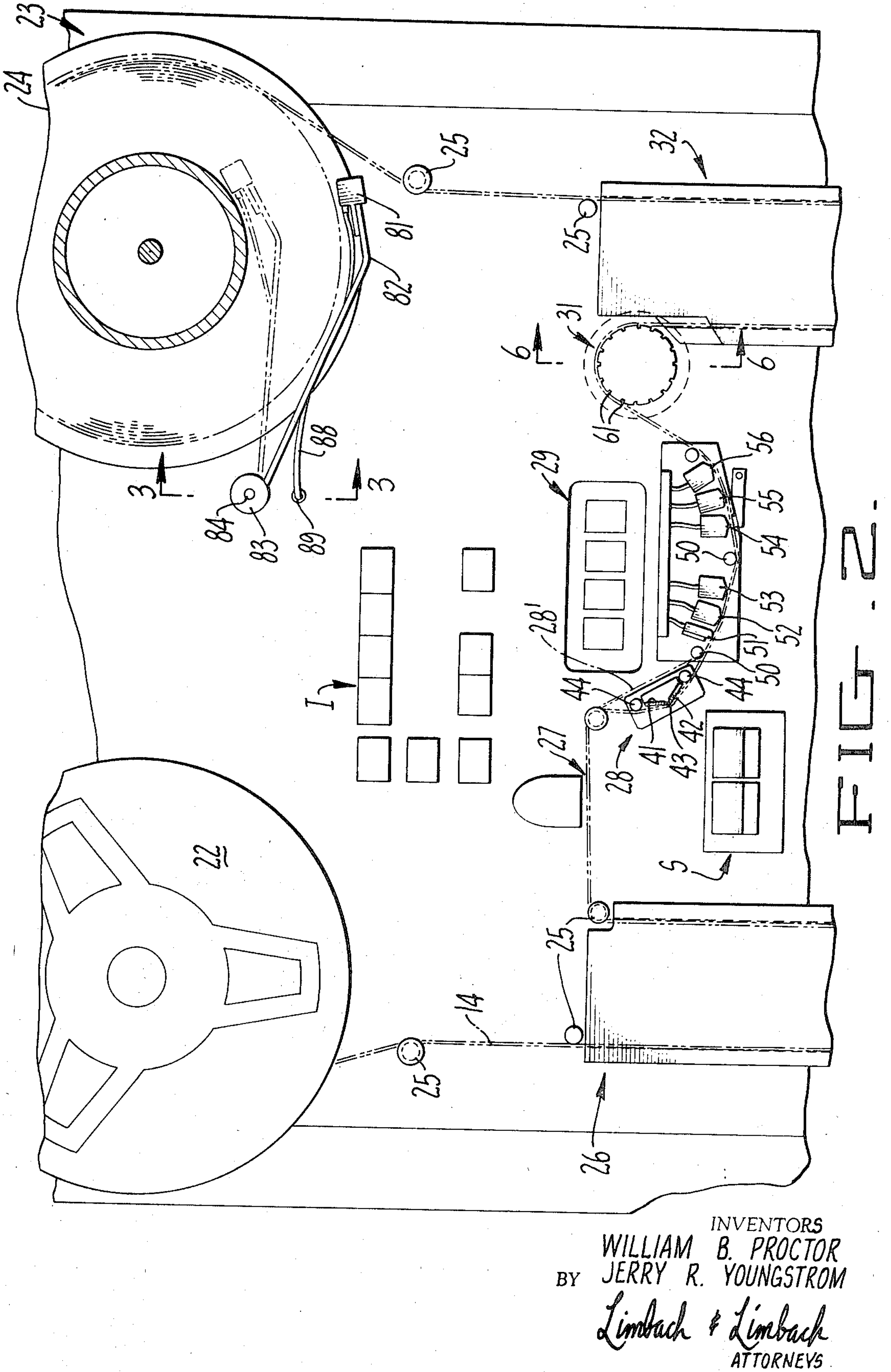
FIG. 2 is an enlarged front elevational view of a portion of the tape deck of the machine shown in FIG. 1.

The tape deck assembly 13, shown in enlarged scale in FIG. 2, includes a front tape deck plate 20 on which are located a tape supply station 21 supporting a tape supply roll 22, a tape takeup station 23 supporting a tape takeup roll 24, and tape guides 25 for guiding the tape to other tape-handling apparatus on the face of the machine.

Of the tape-handling apparatus located between the supply station 22 and the takeup station 23, a supply tape accumulator assembly 26 is located for receiving tape from supply station 22 for passage to a tape inspection station 27, a cleaning station 28, a magnetic detection station 29, and a tape transport 31 in the form of a capstan drive. A takeup tape accumulator 32 is located between the capstan drive 31 and the tape takeup station 23 which also includes a lay-on arm assembly 33 for tightly packing the tape as will be described in greater detail below. Also, provided on the tape deck 13 are a main operating switch S and indicators I for signal level, skew, beginning and end of tape, and the like on the tape deck 13.

Each of the takeup accumulators 26 and 32 includes a vacuum column 34 connected to a vacuum system 35 having a vacuum control valve 36 whereby appropriate vacuum pulled on the columns 34 pulls the tape 14 into the column to accumulate tape, provide appropriate tape tension and position the tape therein for controlling the rotational speed and direction of the supply and takeup rolls 22 and 24.

Feed of the tape from and to the rolls 22 and 24 is accomplished by tape level detectors 37*a*, *b*, *c* and *d* at the top and bottom of supply accumulator 26 and the top and bottom of takeup accumulator 32, respectively. Each of the level detectors 37*a*, *b*, *c* and *d* includes a light source 38 and a photocell 39 mounted on opposite sides of the column 34 and connected in circuit to operate the forward and reverse speeds of drive motors for the supply and takeup rolls 22 and 23. More specifically, level detector 37*a* at the top of supply column 26 is provided in circuit with the motor of supply roll 22 such that roll 22 rotates to move tape into the accumulator 26 to maintain the light path between the light source and the photodiode covered by tape. With the level detector 37*b* lower in the column 26, the roll 22 is driven to withdraw tape from the accumulator 26 to maintain the light path between the light source and photodiode uncovered by tape.

In tape accumulator 32 between the capstan drive 31 and the takeup reel 23, the top tape level detector 37*c* drives the reel 24 in reverse to keep the light path thereof covered by tape, and the level detector 37*d* at the bottom of that column drives the takeup roll 24 to keep the light path uncovered by tape.

As will appear in greater detail below, the capacity of takeup accumulator 32 is larger than the distance between the inspection station 27 and the detection station 29 so that on reversal of the tape for movement from the detection station 29 to the inspection station 27 tape is fed out of the takeup accumulator 32 without reversing the takeup roll 24. With this construction and operation, the takeup roll 24 is never reversed during certification of a tape and consequently results in winding a tape pack with a smooth flat side.

Referring now to FIG. 2, tape moving from the supply accumulator to the detection station passes the inspection station 27 where the tape is illuminated and can be inspected under a magnifying glass. Additionally, the inspection station 27 can include a microscope for detailed examination of the tape.

In the cleaning station 28 for processing the tape following the inspection station 27, a pair of blades 41 and 42 are positioned with their knife edges 43 pointing substantially toward one another but at a slight angle with respect to one another so that tape guided over guideposts 44 and past the knife edges is cleaned to remove any surface irregularities or collected foreign particles. Bypass path 28′ permits the cleaner to be bypassed.

In the magnetic detection station 29, a plurality of heads are provided for operation on the tape as it passes over guideposts 50. Typically, precision tape certified by a machine in accordance with the present invention includes nine parallel tracks or channels running longitudinally of the tape. The first head encountered by the tape in the detection assembly 29 is a full width DC erase head for erasing all signal from the tape and followed by a four-track noise detection read head 52 and a five-track noise detection read head 53 with the four read heads of head assembly 52 staggered between the five read heads of head assembly 53 so that all nine tracks of the tape can be read and the tape certified over its full width.

During certification, the tape is erased on passing erase head 51 and the nine tracks are read by read heads 52 and 53. Any discontinuities in the magnetic coating on the tape will register as noise detected by the read heads 52 and 53 and the retry circuit logic described below operated to eventually position any discontinuity in the viewing area of the inspection station 27. After moving part the read heads 52 and 53, the tape passes a full width write head 54 in which digits "1" are recorded across the full width of the tape. This recording can be accomplished for certification at the appropriate bit density such as 800 or 3,200 bits per lineal inch. A pair of four-track and five-track read heads 55 and 56 are positioned along the tape path following the write head 54 for reading all of the nine channels of recorded digital information. Any dropout in the tape will be detected by these read heads by way of a decrease of signal on any channel below a preset threshold level. Detection of a dropout causes reversal of the tape as described in greater detail below to move the region of the dropout back to the inspection station 27 in order to try to recertify the suspected section of tape. If two successive retries also result in a dropout, the certifier will stop with the dropout positioned in the illuminated area of the inspection station 27 where it can be removed or repaired if possible.

Movement of tape 14 between the inspection and detection stations is controlled by the transport 31 which includes a capstan 60 provided with notches 61 on its surface for positive control of the tape. Tape slippage on the capstan is eliminated completely so that errors are not introduced in the digital tape length counting. While the capstan 60 can be located anywhere between the tape accumulators 26 and 32, it is shown in this embodiment of the invention between the detection station 29 and the takeup accumulator 32 where it is out of the region of movement for detected errors between the detection station 29 and the inspection station 27.

Figures 3, 4, 5, 6, 7:
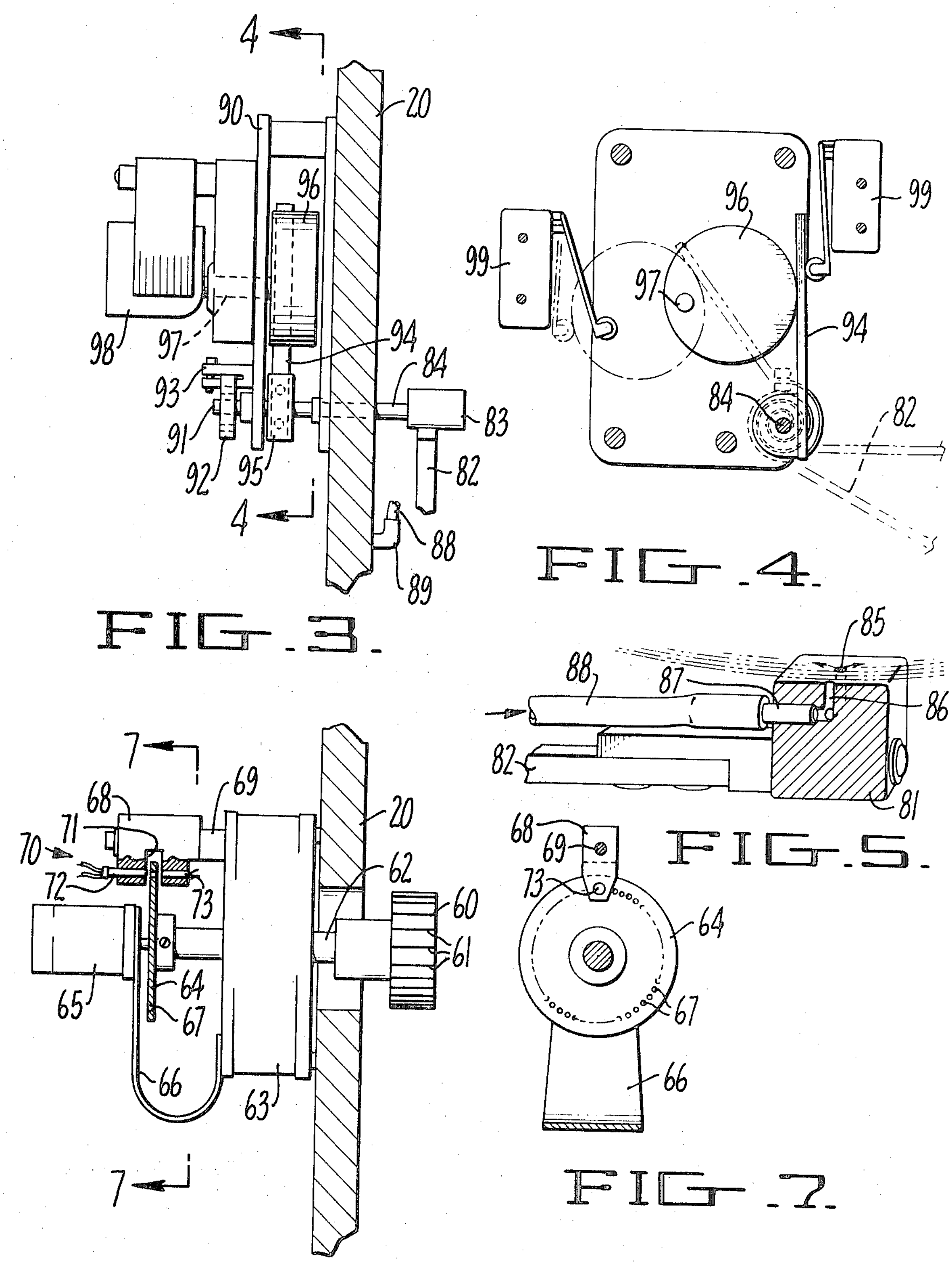
FIG. 3 is a sectional view of a portion of the structure shown in FIG. 2 taken along line 3—3 in the direction of the arrows.
FIG. 4 is an elevational sectional view of a portion of the structure shown in FIG. 3 taken along line 4—4 in the direction of the arrows.
FIG. 5 is an enlarged perspective view, partially in section, of the lay-on arm shown in FIG. 2.
FIG. 6 is an enlarged sectional view of a portion of the structure shown in FIG. 2 taken along line 6—6 in the direction of the arrows.
FIG. 7 is an elevational sectional view of a portion of the structure shown in FIG. 6 taken along line 7—7 in the direction of the arrows.

Precise control of the tape between the detection and inspection stations is accomplished by a digital measuring encoder directly connected to the capstan drive as better illustrated in FIGS. 6 and 7. Referring now to FIGS. 6 and 7, the capstan 60 is connected via shaft 62 to the capstan drive motor 63 which has controls (not shown) for forward, reverse and stop. On the end of the shaft 62 opposite the location of the capstan 60, a disc encoder 64 is keyed to the shaft 62 which is also connected to a generator 65 mounted on a support bracket 66. The generator can provide a signal which is an analog of the tape speed and can be used for other functions of the machine not forming a part of this invention.

The disc encoder 64 includes a series of apertures 67 uniformly spaced apart on a circle on disc 64 centered with the axis 62. A holder 68 mounted on a support post 69 on the motor 63 is provided with a disc-receiving slot 71 and bores for mounting a lamp 72 and photodiode 73 on opposite sides of the disc 64 on the circle of apertures 67. During rotation of the disc 64, the interruption of light passing through holes 67 to the photodiode 73 provides an optical digital encoder providing a direct reading of the position of the tape 14. This encoder is connected to a Nixie tube footage counter 74 providing a direct readout of the length of tape wound on the reel. With this encoder, the footage is accurately and constantly being registered in all modes of operation, forward and reverse, both fast and slow, and certification retry as will be described below.

The optical encoder is also connected to an up/down footage counter 116 which will be described below with reference to FIG. 8.

Referring now to FIG. 5, there is shown the lay-on arm for providing a uniform wrap of tape on the takeup roll 24 without wear of the tape surface. The lay-on arm assembly includes a shoe 81 positioned on one end of an arm 82 which is connected at its opposite end to a pivot member 83 mounted on a shaft 84. The shoe 81 includes a plurality of apertures 85 connected via bores 86 which are manifolded to a tube 87 connected to an airhose 88.

The pivot shaft 84 for the lay-on arm projects through the front plate 20 of the tape deck and is rotatably mounted in a motor support plate 90 on the back of plate 20. The end 91 of shaft 84 remote from the pivot member 83 is slotted and connected to one end of a coil spring 92, the other end of which is connected to a spring retainer post 93 supported on the motor support plate 90. This spring 92 biases the lay-on arm against the roll of tape but a spring tension release member in the form of an arm 94 connected to shaft 84 via a shaft clamp 95 operates in conjunction with an actuating cam 96 to lower the lay-on arm onto the pack and lift it off of the pack at the beginning and end of each tape reel. The actuating cam 96 mounted on a shaft 97 is driven by a gear motor 98 controlled by microswitches 99 and command signals from the machine.

The lay-on arm is located almost a full turn of the reel away from the point where the tape enters to facilitate initial threading of tape on the reel. Thus, when the tape is to be threaded, the tape end is lifted over the top of the reel and pulled around far enough to be engaged by the lay-on arm. When the lay-on arm is then lowered by the cam, it holds the tape end around the hub of the reel for first turn wrapping.

Figure 8:
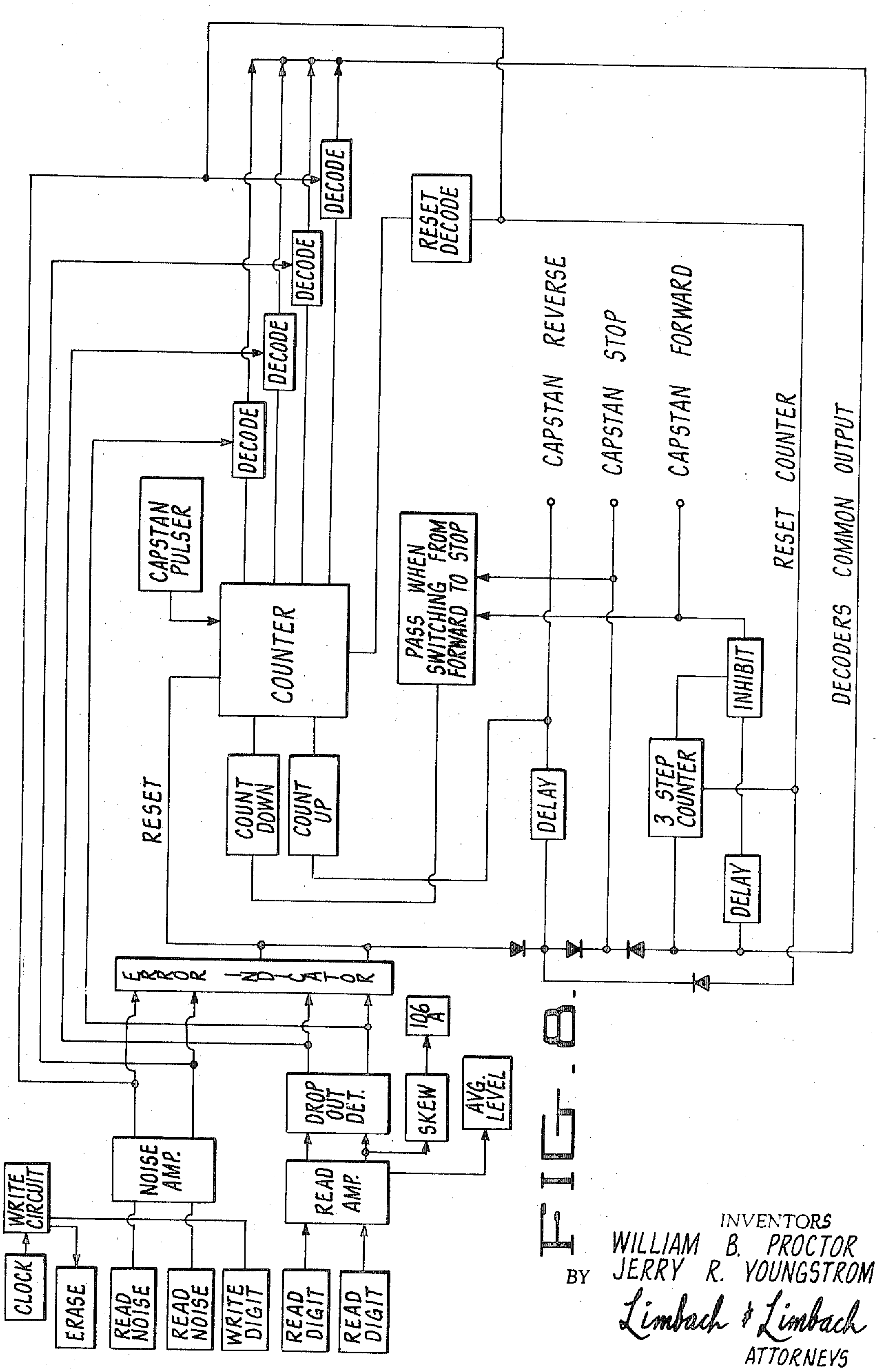
FIG. 8 is a schematic block diagram view illustrating the logic circuitry for operation of the capstan shown in the foregoing figures.

Referring now to FIG. 8, the operation of the logic control for the tape transport is there illustrated. The DC erase and AC write heads 51 and 54 are driven from a write circuit 101 controlled by a clock 102. Errors detected by the noise-reading heads 52 and 53 are sent though an amplifier 103 and via lines 111 and 112, respectively, to an error indicator 110 that puts out an error pulse. Signals received from read heads 55 and 56 are passed through an amplifier 104 to a dropout detector 105 and via lines 113 and 114 to the error indicator 110. Comparison of the signals on the two outside tracks read by head 56 is made in a skew-determining circuit which lights a skew error indicator 106A if the measured skew exceeds a predetermined level. The signal level is sensed in average lever detector 107, and if the signal level is either too high or too low, appropriate indication is made by indicators I on the tape deck.

Besides connection to the error indicator, error signals on the lines 111–114 are also respectively connected to enable decoders 121–124 for enabling passage of an output decoder signal on common output line 125 for control of the transport in a manner to be described in greater detail below.

The error signal from error detector 110 is connected via reset line 115 to an up/down counter 116 for resetting the counter to zero and also via a line 117 to the capstan stop and reverse controls. Counter 116 counts pulses from the optical pulser 70 on the capstan drive shaft. Line 117 is connected through a delay circuit 118 and line 119 to the capstan reverse switch and through a protective diode 126 and line 127 to the capstan stop switch. Line 127 is also connected to a control circuit 128 which passes signal pulses onto a count down trigger function 129 to the up/down counter 116 when the capstan drive is being switched from forward drive to stop. Line 119 is also connected to a count up switch or function 130 for the counter 116.

Enable decoders 121–124 permit an output pulse from the counter 116 to output circuit 125 when the counter 116 has counted to a measuring level for the particular decoder activated by the error signal. Passage of a pulse through the decoders to line 125 indicates movement of a length of tape measured by the capstan pulser 70 equivalent to the distance from the particular head where the error signal was initiated back to the inspection station 27.

In an operative embodiment of this invention, the decoder 121 provides an output signal when the counter 116 has counted a movement equivalent to the distance 5.6 inches, the tape distance from read head 52 to the inspection station 27. Similarly, decoders 122, 123 and 124 operate for tape movement of 6.6 inches, 8.6 inches and 9.6 inches.

The decoder common output line 125 is connected through a delay circuit 131 and a signal-inhibiting circuit 132 via line 133 to the capstan forward drive switch and the passing circuit 128. Additionally, decoder common output circuit 125 is connected to a three-step counter 134 controlling the inhibiter 132 and through a diode 135 to line 127 connected to the capstan stop switch. A reset decoder 136 connects the up/down counter 116 to clear the step counter 134.

The control logic circuit operates in the following manner. An error signal received in any one of lines 111–114 provides an error pulse signal through line 115 to reset the counter while the appropriate decoder corresponding to the error detection line is set to provide an output pulse in line 125 when the up/down counter 116 counts to the preset count of that decoder corresponding to the appropriate tape distance from the respective detection head to the inspection station.

At the same time the counter is reset, the pulse from the error indication circuit 110 initiates the stop switch of the capstan over lines 117 and 127, and since the capstan drive is moving fast from forward to stop, the pulse is passed through the circuit 128 to initiate the down-counting switch 129 of the counter 116 for counting down or negatively the distance of tape travel until the tape stops. After the delay from circuit 118 when the tape is stopped, a delayed signal pulse on line 119 initiates the capstan reverse switch and countup switch 130, and the tape moves in reverse direction until the counter reaches the count level of the particular decoder 121–124 that has been activated by the error signal. At this point, the error in the tape is positioned at the inspection station, and a pulse passes to the common output line 125.

The countdown function of components 128 and 129 prevents tape-measuring errors as the tape coasts to a stop from fast forward.

The decoder pulse first initiates the capstan stop via line 127, and after a delay from delay line 131, passes the pulse to the capstan forward drive through inhibiter 132 and line 133. The signal from the decoder output line 125 also advances the three-step counter 134 which controls the inhibiter 132.

Moving again in the forward direction, the tape approaches the previously detected error for recertification. If the error has been corrected, such as by removal of a piece of foreign material or simply by moving through the cleaning assembly, and the tape passes the previously detected error, the tape will continue to move until the counter counts up to the level of the reset decoder 136. The reset decoder is set at a level to permit an error first detected by the last head 56 to clear that last head when the tape is moved forward for recertification. Reset decoder 136 rests and holds the three-step counter 134, and the tape is stepped back and then continues to move forward for continuous certification of the tape.

If the detected error is not certified on the first retry and an error such as a dropout is again detected in the same location, the reversal operation is again initiated as described above for a second retry. That is, the counter is reset; the tape is stopped and reversed the desired distance from the appropriate decoder; the tape is again driven forward; and three-step counter 134 advanced to the second step.

In the event the error is detected a third time, reversal occurs as before to move the detected error back to the inspection station at which point the three-step counter 134 is advanced to the third position. At this switch position, inhibiter 132 is actuated thereby preventing reinitiation of forward speed and maintaining the capstan stopped with the error positioned at the inspection station.

With the takeup accumulator 32 having a capacity larger than the distance from the detection station 29 back to the inspection station 27 so that an error detected by the last reading head 56 does not draw tape from the takeup accumulator 32 up to the level detector 37*c*, the reversal of tape and retry for certification of the detected error is accomplished without ever reversing the takeup roll 24. With this construction and operation, a smooth side surface is provided on the tape pack as it is finally certified ready for shipment and sale.

Under usual operation conditions, the level detector 37*c* need not even be provided on the machine since the tape will never be reversed to the level detector 37*c*. The only instance when this level detector 37*c* might be required would be in the event that, after a first detected error and reversal for retry of the detected error, another error, not detected on the first run through the detection station, is detected in the tape before the first detected error reaches the detection station. In this event, on reversal for retry for certification of the second detected error, the tape will have been moved back a total distance greater than the distance between the detection station and the inspection station.

What is claimed is:

1. Apparatus for certifying magnetic recording tape comprising:
   - a magnetic detection station for detecting errors in magnetic tape;
   - a tape inspection station;
   - a tape supply station adapted to support a roll of tape;
   - a tape takeup station adapted to support a takeup roll of tape; and
   - a tape transport for moving tape from said supply station past said inspection station and said detection station to said takeup station, said transport having means for automatically moving tape from said detection station back to said inspection station responsive to detection of an error at said detection station without moving tape out of said takeup station.

2. The apparatus of claim 1 wherein said tape transport includes means for advancing from said inspection station to said detection station, a given number of times, tape returned from said detection station to said inspection station whereby tape returned to said inspection station upon detection of an error is passed to said detection station the given number of times to verify the existence of an error.

3. The apparatus of claim 2 wherein:
said detection station includes a plurality of spaced-apart reading heads and
said transport includes means for measuring the length of tape moved between said detection station and said inspection station.

4. The apparatus of claim 1 wherein
said detection station include a plurality of spaced-apart reading heads and
said tape transport includes
digital measuring means for measuring the length of tape moved between said detection station and said inspection station,
means for advancing from said inspection station to said detection station a given number of times a returned measured length of tape first returned from said detection station to said inspection station, and
means for stopping the tape at said inspection station after the returned tape has been advanced and returned from said detection station the given number of times.

5. The apparatus of claim 1 wherein said tape transport includes digital measuring means for measuring the length of tape moved by said transport in either direction.

6. The apparatus of claim 1 including
tape accumulator means between said detection station and said takeup station and having a tape capacity larger than the distance between said inspection and detection stations and
said transport including
means for maintaining said capacity of tape in said accumulator means while tape is being fed off of said supply roll and
means for preventing tape from moving off of said takeup roll as said capacity is reduced in said accumulator means during tape movement from said detection station back to said inspection station whereby tape is wound onto said takeup roll without reversing said takeup roll.

7. The apparatus of claim 1 wherein said magnetic detection station includes
means for detecting simultaneously impressed signals in the outside recording channels on recording tape and
means for measuring time delay between signals detected by said detecting means whereby dynamic skew is determined.

8. The apparatus of claim 1 wherein said tape takeup station includes
a lay-on arm,
means for mounting said arm for pivotal movement of a portion thereof against tape being wrapped on the takeup roll and
means for blowing air through an aperture in the end of said takeup arm for providing an air bearing between the end of said takeup arm and the tape and driving air from between wrapping layers of the tape.

9. Apparatus for certifying magnetic recording tape which comprises
a magnetic detection station for detecting errors in magnetic tape,
a tape-cleaning station,
a tape inspection station,
a tape supply station adapted to support a supply roll of tape,
a tape takeup station adapted to support a takeup roll of tape, and
a tape transport for moving tape from said supply station past said inspection station, said cleaning station, and said detection station to said takeup station with said transport having
means for automatically moving tape from said detection station back to said inspection station responsive to the detection of an error at said detection station,
tape accumulator means between said detection station and said takeup station having a tape capacity larger than the distance between said inspection and detection stations,
means for maintaining said capacity of tape in said accumulator while tape is being fed off of said supply roll, and
means for preventing tape from moving off of said takeup roll as said capacity is reduced in said accumulator whereby tape is wound onto said takeup roll without reversing said takeup roll.

10. Apparatus for certifying magnetic recording tape comprising
a magnetic detection station for detecting errors in magnetic tape including
an erase head,
at least one reading head for reading the tape moved past said erase head to detect discontinuities in the tape,
a recording head for recording repetitive digital signals on the tape,
at least one reading head for reading signals recorded by said recording head to detect dropouts on the tape;
a tape inspection station;
a tape supply station adapted to support a supply roll of tape;
a tape takeup station adapted to support a takeup roll of tape; and
a tape transport for moving tape from said supply station past said inspection station and said detection station to said takeup station with said transport having
digital measuring means for measuring the length of tape moved between said detection station and said inspection station,
means for automatically moving tape from said detection station a predetermined measured distance back to said inspection station responsive to the detection of an error at said detection station,
means for advancing from said inspection station to said detection station, a given number of times, the length of tape returned from said detection station to said inspection station,
means for stopping the tape at said inspection station after the returned tape has been advanced to and returned from said detection station the given number of times, and
tape accumulator means between said detection station and said takeup station and having a capacity larger than the distance between said inspection and detection stations, said transport including
means for maintaining said capacity of tape in said accumulator means while tape is being fed off of said supply roll and
means for preventing tape from moving off of said takeup roll as said capacity is reduced in said accumulator means whereby tape is wound onto said takeup roll without reversing said takeup roll.

11. Apparatus for certifying magnetic recording tape comprising,
a magnetic detection station for detecting errors in magnetic tape including
an erase head,
at least one reading head for reading the tape moved past said erase head to detect discontinuities in the tape,
a recording head for recording digital signals on the tape,
at least one reading head for reading signals recorded by said recording head to detect dropouts and to detect simultaneously impressed signals on the outside recording channels on the tape, and
means for measuring time delay between the detected simultaneously impressed signals to determine dynamic skew;
a tape inspection station;
a tape supply station adapted to support a supply roll of tape;

a tape takeup station adapted to support a takeup roll of tape and tightly wrap tape thereon including a lay-on arm, means for mounting said arm for pivotal movement of a portion thereof against the tape being wrapped on the takeup roll, means for spring biasing said lay-on arm against the tape being wrapped on said takeup roll, and means for blowing air through an aperture in the end of said takeup arm for providing an air bearing between the end of said takeup arm and the tape and driving air from between wrapping layers of the tape, a tape transport for moving tape from said supply station past said inspection station and said detection station to said takeup station with said transport having means for automatically moving tape from said detection station back to said inspection station responsive to the detection of an error at said detection station, means for measuring the length of tape moved back from said detection station to said inspection station, means for advancing from said inspection station to said detection station, a given number of times, the length of tape returned from said detection station to said inspection station, means for stopping the tape at said inspection station after the returned tape has been advanced to and returned from said detection station the given number of times, means for maintaining said capacity of tape in said accumulator means while tape is being fed off of said supply roll, and means for preventing tape from moving off of said takeup roll as said capacity is reduced in said accumulator means whereby tape is wound onto said takeup roll without reversing said takeup roll.

12. The method of certifying magnetic recording tape comprising the steps of feeding tape from a tape supply to a detection station, moving tape past the detection station for detecting errors in the tape, taking up tape from the detection station on a takeup roll, accumulating a portion of tape between the detection station and the takeup roll, detecting errors in said tape, and upon detection of an error returning tape from the detection station to an inspection station only from the accumulated portions while preventing removal of tape from said takeup roll.

13. The method of certifying magnetic recording tape comprising the steps of feeding tape from a tape supply to a detection station, moving tape past the detection station for detecting errors in the tape, taking up tape from the detection station on a takeup roll, detecting errors in said tape at one of a plurality of positions of the detection station, upon detection of an error returning tape a measured distance from the detection station to an inspection station, advancing the returned tape a given number of times from the inspection station to the detection station, stopping the tape at the inspection station after the returned tape has been advanced the given number of times and returned to said inspection station, and accumulating between the detection station and the tape takeup roll a portion of tape in excess of the measured distance from any one position to the inspection station and upon detection of an error returning tape from the detection station to the inspection station only from the accumulated portion of tape while preventing removal of tape from said takeup roll.

* * * * *